United States Patent
Chenoweth

(10) Patent No.: US 10,364,728 B2
(45) Date of Patent: Jul. 30, 2019

(54) SYSTEM AND METHOD FOR ASSEMBLING AN EXHAUST AFTERTREATMENT ASSEMBLY

(71) Applicant: Caterpillar Inc., Peoria, IL (US)

(72) Inventor: Kurtis E. Chenoweth, Ipava, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/838,928

(22) Filed: Dec. 12, 2017

(65) Prior Publication Data

US 2019/0178139 A1 Jun. 13, 2019

(51) Int. Cl.
*F01N 3/28* (2006.01)
*F01N 13/00* (2010.01)

(52) U.S. Cl.
CPC .......... *F01N 3/2853* (2013.01); *F01N 13/00* (2013.01); *F01N 2350/04* (2013.01)

(58) Field of Classification Search
CPC ..... F01N 3/2853; F01N 2350/04; F01N 13/00
USPC ........................................ 422/168, 177, 179
See application file for complete search history.

(56) References Cited

U.S. PATENT DOCUMENTS

| 4,238,455 A | 12/1980 | Ogiwara |
| 4,324,701 A | 4/1982 | Honda et al. |
| 2011/0030355 A1 | 2/2011 | Gilmer et al. |
| 2018/0171852 A1* | 6/2018 | Chenoweth ............. F01N 3/286 |

FOREIGN PATENT DOCUMENTS

| WO | 2014199008 | 12/2014 |
| WO | 2016036802 | 3/2016 |

* cited by examiner

*Primary Examiner* — Tom P Duong

(57) ABSTRACT

A system for assembling an exhaust after-treatment assembly having a plurality of exhaust after-treatment blocks is described. Each of the plurality of exhaust after-treatment blocks is disposed adjacent to at least one other exhaust after-treatment block. Each exhaust after-treatment block has one or more catalyst substrates. Each catalyst substrate includes a first face, a second face, and a plurality of side faces. The system includes at least one flange member to surround the one or more catalyst substrates about the side faces. The system further includes a locking arrangement including one or more clips on the flange member and a bracket member configured to engage with the one or more clips in the flange members of the adjacent exhaust after-treatment blocks.

17 Claims, 7 Drawing Sheets

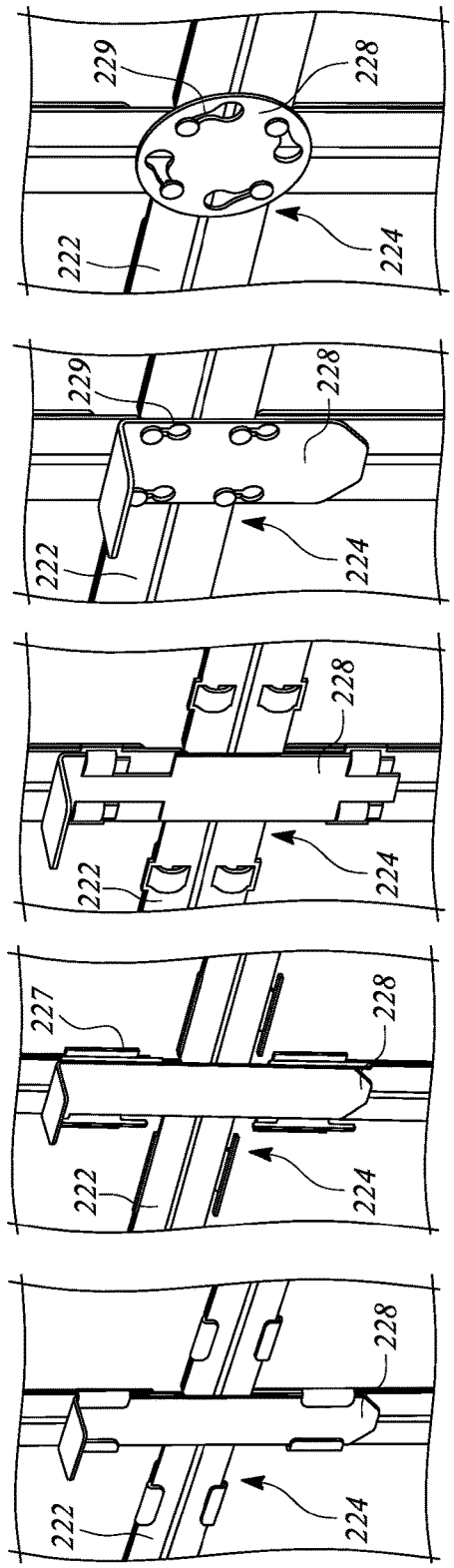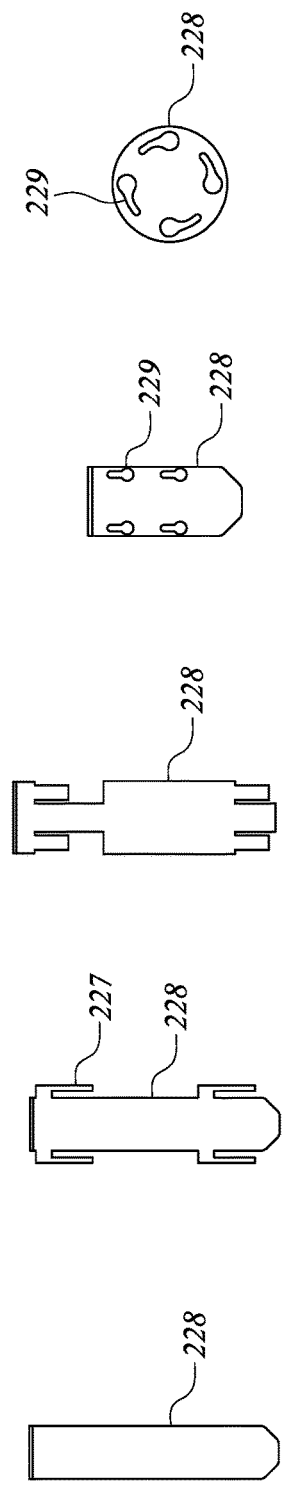

SYSTEM AND METHOD FOR ASSEMBLING AN EXHAUST AFTERTREATMENT ASSEMBLY

TECHNICAL FIELD

The present disclosure relates to an exhaust after-treatment assembly, and more particularly, to a system and method for assembling an exhaust after-treatment assembly.

BACKGROUND

Power systems, particularly internal combustion engines like diesel engines, gasoline engines and natural gas burning turbines, create byproducts and emissions during operation including nitrogen oxide emissions such as NO and $NO_2$, sometimes represented as $NO_x$. To reduce the amount or effect of the nitrogen oxides produced by the internal combustion engines, a process called selective catalytic reduction is employed in which exhaust gases, usually intermixed with a reductant agent, are adsorbed onto a catalyst substrate located downstream in the internal combustion engine. Although, catalyst substrates for locomotive engine applications are known, current emission regulations require stringent reduction of harmful emissions from large internal combustion engines. Examples of such large engines include generator sets and marine engines.

Because of the large amount of emissions produced by such engines, a catalyst substrate can have a cross-section area to adequately treat exhaust gases without producing undesirable back pressure on the engine. The current processes for manufacturing of catalyst substrates limit their cross section. Consequently, catalyst substrates for large engine applications are provided with a plurality of available catalyst substrates packed together to adequately treat exhaust flow without creating detrimental back pressure on the engine. However, these catalyst substrates, generally formed by extrusion process, have a large tolerance variation that requires complicated sorting to match parts for packaging in a specific size. This result in a wide variation in installation pressures that may damage catalyst substrate or bulge an outer canister which is generally adapted to group catalyst substrates with uniform sizes and shapes. Further, when such catalyst substrates are packed together to form a larger unit, there may be gaps between them because of variations in their dimensions. These gaps may provide passages through which the exhaust gases may leak untreated, which result in lower $NO_x$ conversion and the engine not meeting the required regulations.

US Patent Application Number 20110030355 A1, hereinafter referred to as the '355 application, relates to a catalytic converter cartridge comprising multiple square, rectangular or other flat sided catalyst coated substrates, each substrate of which has each of its flat sides covered by a compressible mat material. These mat-covered substrates or modules are arranged into a multiple module array enclosed within a metal shell with each module preferably separated from adjacent modules by sheet metal spacers.

SUMMARY

In one aspect of the present disclosure, a system for assembling an exhaust after-treatment assembly having a plurality of exhaust after-treatment blocks is described. Each of the plurality of exhaust after-treatment blocks is disposed adjacent to at least one other exhaust after-treatment block. Each of the plurality of exhaust after-treatment blocks includes one or more catalyst substrates. Each of the catalyst substrates includes a first face, a second face, and a plurality of side faces. The system includes at least one flange member configured to surround the one or more catalyst substrates in each of the plurality of exhaust after-treatment blocks, about the side faces. The system further includes a locking arrangement. The locking arrangement includes one or more clips on the at least one flange member and disposed in a plane parallel to at least one of the first face and the second face. The locking arrangement further includes a bracket member configured to engage with the one or more clips in the at least one flange member of each of the adjacent exhaust after-treatment blocks.

In another aspect of the present disclosure, a method of assembling an exhaust after-treatment assembly is described. The method includes surrounding one or more catalyst substrates with at least one flange member to define an exhaust after-treatment block. The at least one flange member has substantially flat sidewalls and includes one or more clips provided thereon. The method further includes disposing each of a plurality of exhaust after-treatment blocks adjacent to at least one other exhaust after-treatment block such that the flat sidewalls of the flange members of the adjacent exhaust after-treatment blocks are in contact with each other. The method further includes engaging a bracket member with the one or more clips in the at least one flange member of each of the adjacent exhaust after-treatment blocks.

In yet another aspect of the present disclosure, an exhaust after-treatment assembly is described. The exhaust after-treatment assembly includes a plurality of exhaust after-treatment blocks. Each of the plurality of exhaust after-treatment blocks is disposed adjacent to at least one other exhaust after-treatment block. Each of the plurality of exhaust after-treatment blocks includes one or more catalyst substrates. Each of the one or more catalyst substrates is longitudinally extending between a first face and a second face and has a plurality of side faces. In the exhaust after-treatment block, each of the one or more catalyst substrates is disposed next to at least one other catalyst substrate. The exhaust after-treatment assembly also includes at least one flange member surrounding the one or more catalyst substrates in each of the plurality of exhaust after-treatment blocks, about the side faces. The exhaust after-treatment assembly further includes a locking arrangement. The locking arrangement includes one or more clips on the at least one flange member and disposed in a plane parallel to at least one of the first face and the second face. The locking arrangement further includes a bracket member configured to engage with the one or more clips in the at least one flange member of each of the adjacent exhaust after-treatment blocks.

Other features and aspects of this disclosure will be apparent from the following description and the accompanying drawings.

BRIEF DESCRIPTION OF THE DRAWINGS

FIGS. 7A-7E illustrate different embodiments of a locking arrangement for the exhaust after-treatment assembly, in accordance with one or more embodiments of the present disclosure;

FIGS. 8A-8E illustrate different embodiments of the bracket member for the locking arrangements of FIGS. 7A-7E, in accordance with one or more embodiments of the present disclosure.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
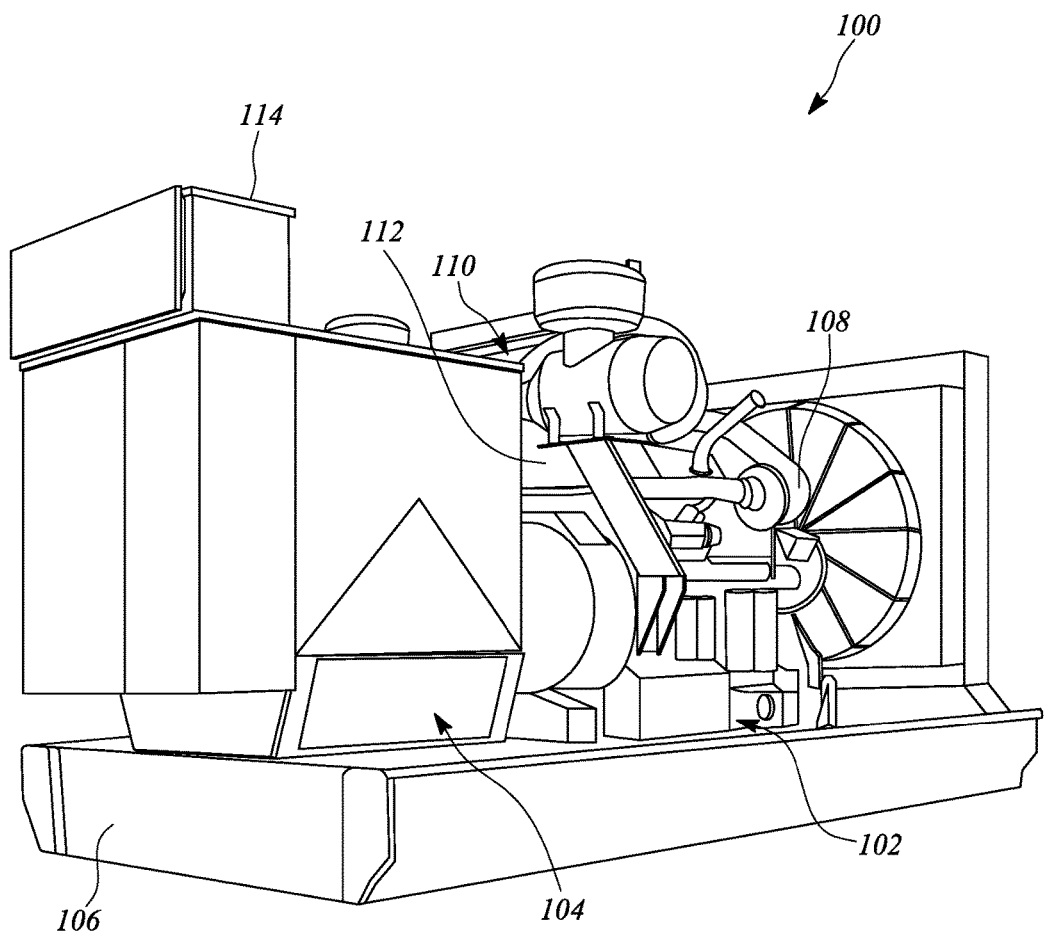
FIG. 1 illustrates a perspective diagrammatic view of an exemplary power system, in accordance with one or more embodiments of the present disclosure.

FIG. 1 illustrates a power system 100 that generates power by combusting fossil fuels. The power system 100 of FIG. 1 may include an internal combustion engine 102, such as a diesel engine, operatively coupled to a generator 104 for producing electricity. The internal combustion engine 102 and the generator 104 may be supported on a common mounting frame 106. The power system 100 may provide on-site stand-by power or continuous electrical power at locations where access to an electrical grid is limited or unavailable. Accordingly, the generator 104 and the internal combustion engine 102 may be scaled or sized to provide suitable wattage and horsepower. It should be appreciated that in other embodiments, the power system 100 may be utilized in other applications, such as gasoline burning engines, natural gas turbines, and coal burning systems. Further, in addition to stationary applications, the power system 100 may be utilized in mobile applications such as locomotives and marine engines.

As illustrated in FIG. 1, the power system 100 may include an air introduction system 108 and an exhaust system 110 to directly intake fresh air and expel exhaust gasses out, respectively. The air introduction system 108 introduces air or an air/fuel mixture to combustion chambers (not shown) of the internal combustion engine 102 for combustion, while the exhaust system 110 includes an exhaust channel 112 in fluid communication with the combustion chambers to direct the exhaust gasses produced by the combustion process to the environment and/or for recirculation in the internal combustion engine 102. In some examples, the power system 100 may also include one or more turbochargers (not shown) operatively associated with the air introduction system 108 and the exhaust system 110 to pressurize intake air by utilizing the positive pressure of the expelled exhaust gasses.

Generally, in the power systems, like the power system 100 of the present disclosure, the exhaust system 110 includes components to condition or treat the exhaust gasses before they are discharged to the environment. For example, the power system 100 may include an exhaust after-treatment module (generally represented by the numeral 114) which may be disposed in fluid communication with the exhaust system 110 downstream of the turbochargers to receive the exhaust gasses discharged from the internal combustion engine 102. The exhaust after-treatment module 114 may be configured to treat, remove or convert regulated emissions and other constituents in the exhaust gasses. The exhaust after-treatment module 114 may be designed as a separate component that may be mounted to the power system 100 generally over the generator 104, for example, and may receive exhaust gasses from the exhaust channel 112. Modular design of the exhaust after-treatment module 114 allows for it to be utilized with different sizes and configurations of the power system 100.

To treat or condition the exhaust gasses, the exhaust after-treatment module 114 may include various types of exhaust treatment devices through which the exhaust gasses may be directed. For example, the exhaust after-treatment module 114 may include a diffuser (not shown) that directs the exhaust gasses to an associated Diesel Oxidation Catalyst (DOC) which contain materials such as platinum group metals like platinum or palladium which catalyzes carbon monoxide and hydrocarbons in the exhaust gasses to water and carbon dioxide via the following possible reactions:

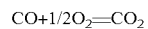

$$CO + 1/2 O_2 = CO_2$$

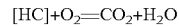

$$[HC] + O_2 = CO_2 + H_2O$$

To further reduce emissions in the exhaust gasses and particularly to reduce nitrogen oxides such as NO and $NO_2$, sometimes referred to as $NO_x$, the exhaust after-treatment module 114 may implement a Selective Catalyst Reduction (SCR) process. In the SCR process, a liquid or gaseous reductant agent is introduced to the exhaust system 110 and directed through a catalyst substrate along with the exhaust gasses. The catalyst substrate is generally formed of materials that cause the exhaust gasses to react with the reductant agent to convert the $NO_x$ to nitrogen ($N_2$) and water ($H_2O$). A common reductant agent is urea (($NH_2$)$_2$CO), though other suitable substances such as ammonia ($NH_3$) may also be used in the SCR process. The reaction may occur according to the following general formula:

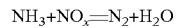

$$NH_3 + NO_x = N_2 + H_2O$$

Figure 2:
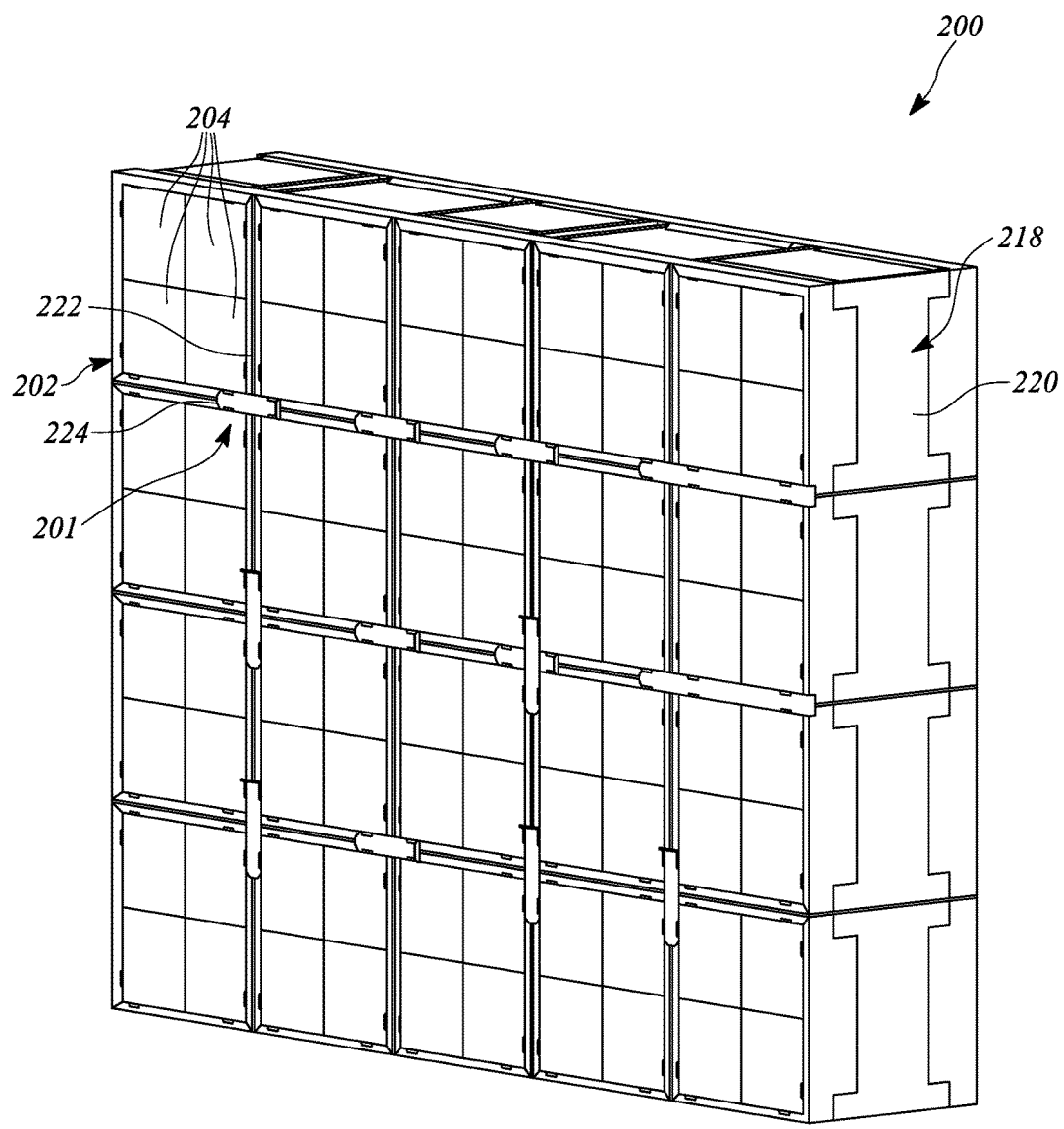
FIG. 2 illustrates a side perspective view of an exhaust after-treatment assembly, in accordance with one or more embodiments of the present disclosure.

For large power systems, like the power system 100 of the present disclosure, a single monolithic block of the catalyst substrate may not be sufficient as there is, generally, a limit to the size of a catalyst substrate that may be manufactured because of its fragility. Therefore, sometimes a plurality of catalyst substrates is packed together to form a single exhaust after-treatment assembly (as illustrated in FIG. 2 and generally represented by the numeral 200) to adequately treat the large quantities of exhaust gases in the power system 100. It may be noted that such prefabricated monolith blocks of the catalyst substrates inherently have deviations in shape and dimensions. Therefore, it may be contemplated that the conventional methods of packing the catalyst substrates by stacking those together may result in gaps therebetween, which in turn may lead to exhaust gases pass through such gaps between the catalyst substrates untreated, thereby reducing the effectiveness of the exhaust after-treatment assembly.

FIG. 2 illustrates the exhaust after-treatment assembly 200 and a system 201 for assembling the exhaust after-treatment assembly 200, according to one or more embodiments of the present disclosure. As illustrated in FIG. 2, the exhaust after-treatment assembly 200 includes a plurality of exhaust after-treatment blocks 202, each of which includes an array of catalyst substrates 204; all of which are closely packed together to form a single unit. In the exhaust after-treatment assembly 200, each of the exhaust after-treatment blocks 202 have substantially identical shape and dimensions. Each of the exhaust after-treatment blocks 202 is disposed adjacent to at least one other exhaust after-treatment block 202. In the illustrated embodiment, the exhaust after-treatment blocks 202 are disposed side-by-side as well as on top of other exhaust after-treatment blocks 202 to complete the exhaust after-treatment assembly 200. In other words, the exhaust after-treatment assembly 200 may define a grid of the exhaust after-treatment blocks 202, typically uniformly sized, and commonly, albeit not essentially, square shaped. That is, although the exhaust after-treatment blocks 202 are shown in the shape of a cube; the exhaust after-treatment blocks 202 may have other cross-sectional shapes such as rectangles, parallelograms, or triangles, among others.

The exhaust after-treatment blocks 202 are modular components which may be removed and replaced in the exhaust after-treatment assembly 200, as required. It may be contemplated that the number of the exhaust after-treatment blocks 202 in the exhaust after-treatment assembly 200 may depend on the required cross-section area of the exhaust after-treatment assembly 200 for proper treatment of the exhaust gases, which is generally based on the specifications of the power system 100. Further, although the specific dimensions of the exhaust after-treatment blocks 202 may be irrelevant to the function of the finished exhaust after-treatment assembly 200, it may be desired that the each of the exhaust after-treatment blocks 202 have unusually tight dimensional tolerances to avoid dimensional stack-up problems during assembling. Although, the exhaust after-treatment block 202 of the present disclosure is used for packaging the catalyst substrates 204 of the SCR, it may be understood that the exhaust after-treatment assembly 200 along with the exhaust after-treatment block 202 may be adapted for packaging the Diesel Oxidation Catalyst (DOC), a Diesel Particulate Filter (DPF) or any other after-treatment devices that may be used to treat the exhaust gases.

Figure 3:
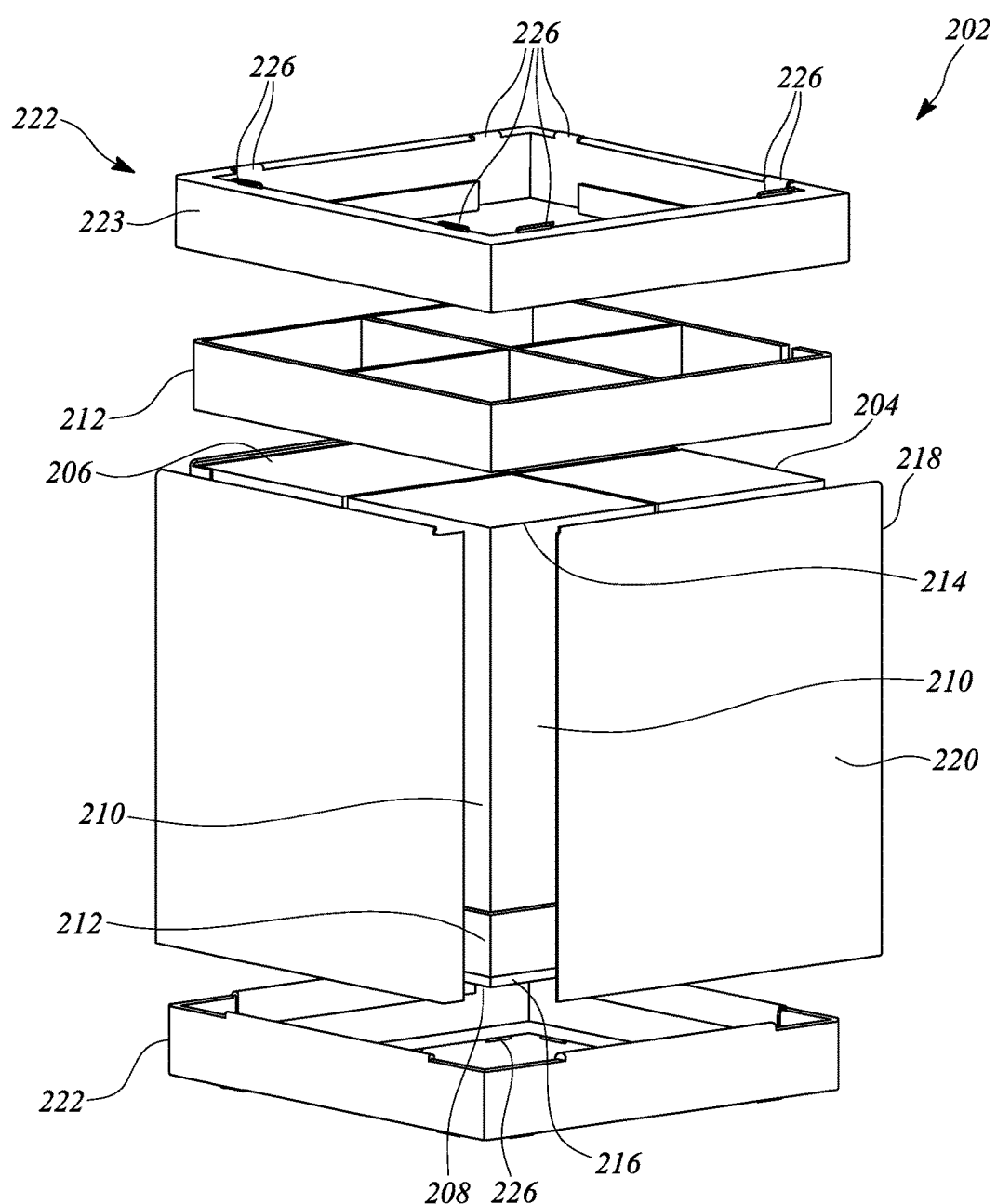
FIG. 3 illustrates an exploded perspective view of an exhaust after-treatment block, in accordance with one or more embodiments of the present disclosure.

FIG. 3 illustrates an exploded view of the exhaust after-treatment block 202, showing its internal components and their relative arrangement with respect to the catalyst substrates 204 enclosed therein. In general, each of the exhaust after-treatment blocks 202 includes one or more catalyst substrates 204. In one example, each of the exhaust after-treatment blocks 202 includes four catalyst substrates 204, as better illustrated in FIG. 4. It may be understood that there may be more than or less than four catalyst substrates 204 of varying shape housed within each of the exhaust after-treatment blocks 202 without any limitations. In one example, the catalyst substrate 204 may be longitudinally extending between a first face 206 and a second face 208 and have four side faces 210. In one example, the first face 206 and the second face 208 of the catalyst substrate 204 may have a square or a rectangular shape, and further, in one example, the four side faces 210 may all have identical flat shape, e.g. square or rectangular; thereby imparting the catalyst substrate 204 an overall cubical shape. Although, such shape of the catalyst substrates 204 may be more common; the catalyst substrates 204 with other possible shapes; such as triangular, hexagonal or any other polygonal shape, may also be employed without any limitations.

During assembly of the exhaust after-treatment block 202, the catalyst substrates 204 are grouped together such that at least one side face 210 of one catalyst substrate 204 is disposed next to at least one side face 210 of one other catalyst substrate 204, and the first faces 206 and the second faces 208 of all the catalyst substrates 204 are parallel to each other. Further, in some examples, one or more compressible mats 212 may be provided in the gaps between the adjacent catalyst substrates 204, separating the side faces 210 of the catalyst substrates 204 therein, to avoid the catalyst substrates 204 contacting each other which may cause cracking. The compressible mat 212 functions to accommodate differentials in expansion between the catalyst substrates 204 and the surrounding metal shell (as explained later), as well as to accommodate variances in the shape and size of the catalyst substrates 204 and the metal shell. The compressible mat 212 further protects the catalyst substrates 204 from vibrations generated during operation of the internal combustion engine 102 and/or the exhaust system 110.

In the example of FIG. 3, two compressible mats 212 are employed in each of the exhaust after-treatment blocks 202; one of the compressible mats 212 is shown enclosing the catalyst substrates 204 and the other one is shown removed from the catalyst substrates 204 for the purpose of illustration. As illustrated, the compressible mat 212 may partially cover the side faces 210 of the catalyst substrates 204. In one example, the two compressible mats 212 may be disposed at a first rim 214 proximate the first face 206 and a second rim 216 proximate the second face 208, to cover at least the vertices of the side faces 210 of the catalyst substrates 204. It may be understood that the compressible mat 212 may not cover the first face 206 and the second face 208, as these faces 206, 208 provide the passage for the exhaust gases to flow through the catalyst substrate 204.

Further, the exhaust after-treatment block 202 may include a mantle 218, in the form of multiple sheets, surrounding the catalyst substrates 204 about the side faces 210 thereof, and the compressible mat 212. The mantle 218 may securely hold the catalyst substrates 204 together while allowing for some expansion or contraction of the catalyst substrates 204. In general, the mantle 218 may provide a box-like housing to enclose the catalyst substrates 204 in the exhaust after-treatment block 202. It may be understood that the mantle 218 may, generally, include same number of sidewalls 220, in this case four sidewalls 220, as the number of the exposed side faces 210 of the catalyst substrates 204 when grouped together. For assembling the exhaust after-treatment blocks 202 together, it may be required that the sidewalls 220 of the mantle 218 provide flat surfaces. In an example, the mantle 218 may be made of multiple flat sheets of steel or any material that provides adequate structural strength with good heat-resistant properties and elastic properties to allow expansion of the catalyst substrates 204. Specifically, as illustrated, the mantle 218 may include four metal sheets that are disposed parallel to each side face 210 of the group of the catalyst substrates 204.

The system 201 includes at least one flange member 222 configured to surround the one or more catalyst substrates 204, in the exhaust after-treatment block, about the side faces 210 thereof. Specifically, multiple flange members 222 are provided to surround the group of the catalyst substrates 204 enclosed within the mantle 218 in the exhaust after-treatment block 202. The mantle 218 is located between a flange member 222 disposed at the first face 206 and another flange member 222 disposed at the second face 208 of the catalyst substrates 204. In one example, the flange member 222 may, generally, have the same width as the compressible mat 212 and may be disposed at the first rim 214 and the second rim 216, directly on top of the compressible mat 212. In another example, the flange member 222 may be a rigid member made of multiple flat sheets of steel or some other rigid material of suitable thickness that provides adequate structural strength with good heat-resistant properties. The flange member 222 may include substantially flat sidewalls 223, specifically four sidewalls 223 as shown in FIG. 3, which are welded together to form the flange member 222 and hence to enclose the catalyst substrates 204 and the compressible mat 212. In some cases, the mantle 218 may bulge out to some extent; but the flange member 222 on top may compensate for the bulging, and thereby pack multiple exhaust after-treatment blocks 202 to form the exhaust after-treatment assembly 200. It may be understood that use of the mantle 281 in the exhaust after-treatment blocks 202 may be optional; and sometimes, the flange member 222 may itself act as the mantle 218 for holding the catalyst substrates 204 when grouped together.

Figure 4:
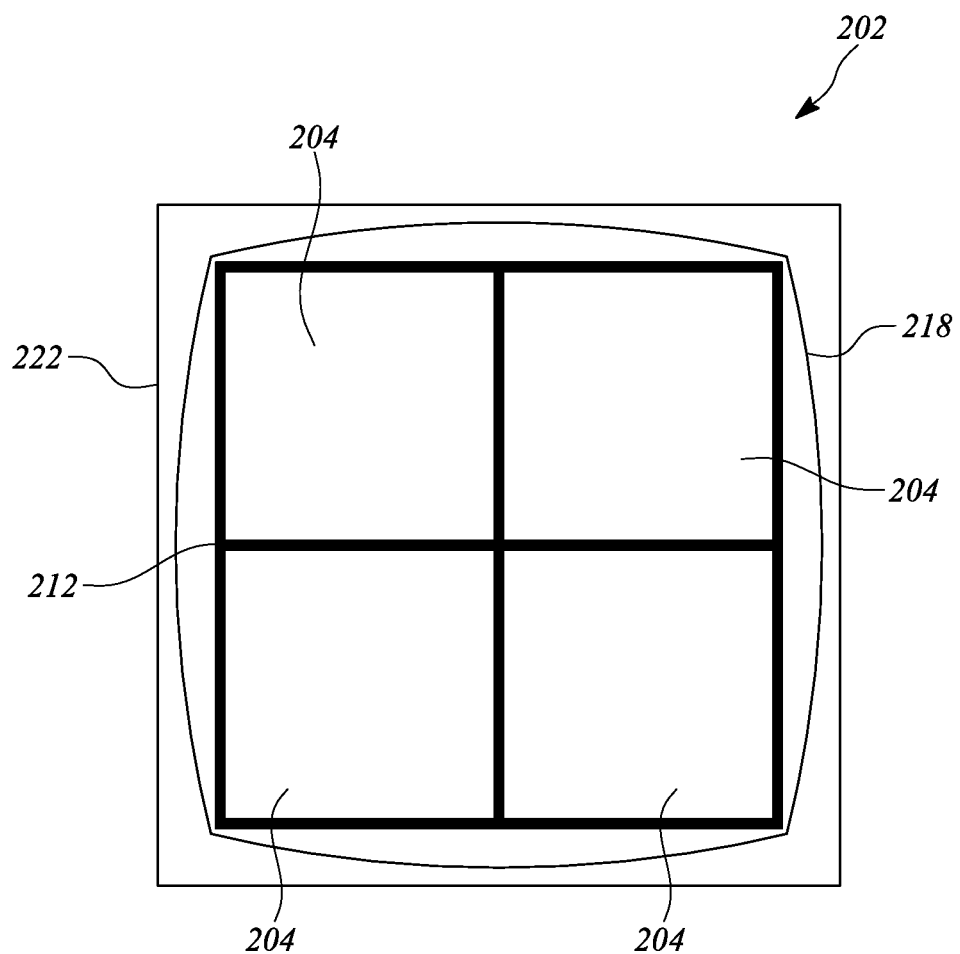
FIG. 4 illustrates a schematic representation of a planar view of the exhaust after-treatment block, in accordance with one or more embodiments of the present disclosure.

FIG. 4 illustrates a schematic representation of a planar view of the exhaust after-treatment block 202. The flange member 222 in the assembled exhaust after-treatment block 202 may allow for each of a plurality of the exhaust after-treatment blocks 202 to be disposed adjacent to at least one other exhaust after-treatment block 202 with no substantial gaps therebetween. It may be understood that multiple flange members 222, for each of the exhaust after-treatment blocks 202, have substantially identical size and shape so that the flange members 222 of the adjacent exhaust after-treatment blocks 202 are snugly in contact with each other without substantial gaps. Further, the flat sidewalls 223 of adjacent flange members 222 may be in contact with each other when the exhaust after-treatment blocks 202 are disposed adjacent to each other. It may be understood that the shape of the exhaust after-treatment block 202 may, generally, conform to the overall shape of the group of the catalyst substrates 204 therein. In the present example, the final cross-sectional shape of the exhaust after-treatment block 202 may be square or rectangular. Although, such shapes of the exhaust after-treatment block 202 may be more common; in other examples, the exhaust after-treatment block 202 may have other possible polygonal shapes without any limitations.

Referring to FIG. 2, the system 201 includes a locking arrangement 224 for securing the plurality of the exhaust after-treatment blocks 202. The locking arrangement 224 may include one or more clips 226 provided on the flange member 222. In one example, as illustrated, the clips 226 are formed proximal to one or more corners of the flange member 222. It may be seen that the clips 226 are attached to the flange member 222 in a plane parallel to at least one of the first face 206 and the second face 208 of the catalyst substrates 204, in the exhaust after-treatment blocks 202. In one example, shape of the clips 226 may be in the form of a hook, protruding substantially orthogonally out from the plane of the first face 206 or the second face 208 of the catalyst substrates 204. It may be contemplated by a person skilled in the art that the clips 226 may be formed at the time of manufacturing of the flange member 222 (e.g. during casting) or later may be joined to the flange member 222 (e.g. by welding). The locking arrangement 224 further includes a bracket member 228 to engage with the clips 226 in the flange members 222 of the adjacent exhaust after-treatment blocks 202. This way, the locking arrangement 224 may be able to constrain the movement of each of the adjacent exhaust after-treatment blocks 202 with respect to each other, to form the exhaust after-treatment assembly 200.

Figure 5:
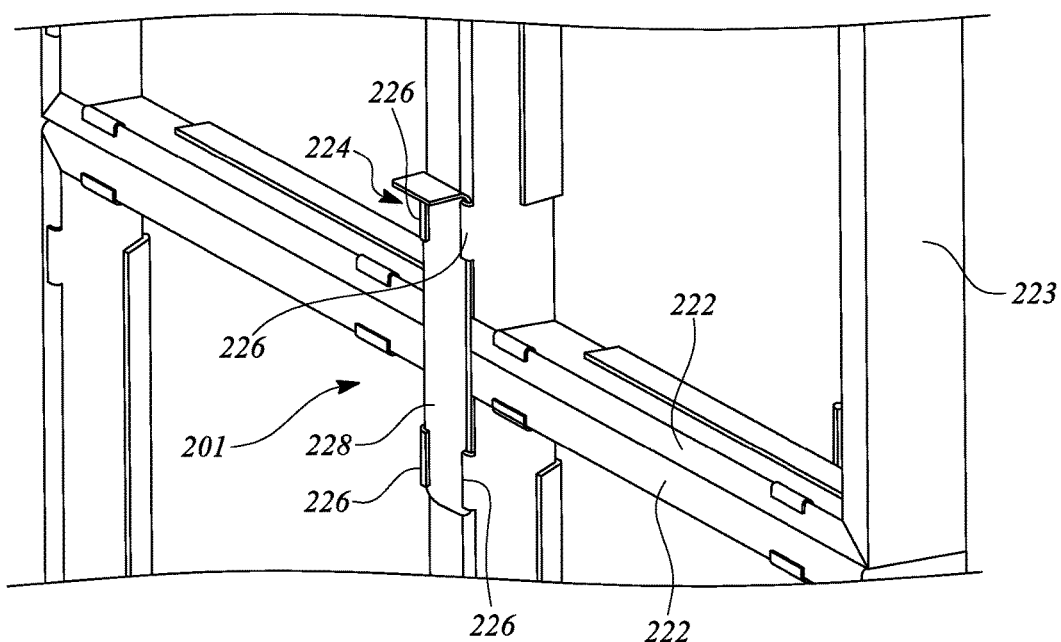
FIG. 5 illustrates an enlarged diagrammatic view of a portion of the exhaust after-treatment assembly, in accordance with one or more embodiments of the present disclosure.

FIG. 5 illustrates an enlarged view of a portion of the exhaust after-treatment assembly 200, highlighting the locking arrangement 224 which connects a set of four flange members 222 of the adjacent exhaust after-treatment blocks 202 therein. As may be seen in FIG. 5, the clips 226 are located at the corners in the flange members 222 so that the bracket member 228 may be engaged with multiple clips 226 in different flange members 222, thereby locking the adjacent exhaust after-treatment blocks 202. In the locking arrangement 224 of FIG. 5, the clips 226 are located on the flange members 222 in a manner such that an open channel is formed between the clips 226 of the adjacent flange members 222 with a width and height of the open channel corresponding to the dimensions of the bracket member 228. This allows for tight engagement of the bracket member 228 in the clips 226, and thereby providing proper securing of the adjacent exhaust after-treatment blocks 202 with each other.

Figure 6:
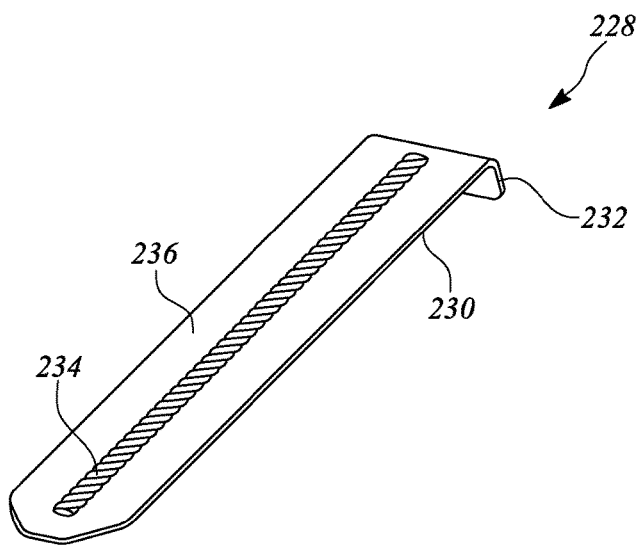
FIG. 6 illustrates a perspective view of an exemplary bracket member, in accordance with one or more embodiments of the present disclosure.

FIG. 6 illustrates one exemplary design of the bracket member 228. In the illustrated design, the bracket member 228 includes a body portion 230 having a length greater than a distance defined between the clips 226 of the adjacent flange members 222. The bracket member 228 may traverse the distance between the clips 226 located on the adjacent flange members 222 to secure the adjacent flange members 222 with each other. Further, as illustrated, the bracket member 228 has a curl portion 232 formed at one of two ends of the body portion 230, which latches onto the one or more clips 226 to engage the locking arrangement 224. In one embodiment, the bracket member 228 may include a gasket 234 attached to a back surface 236 of the body portion 230. When the bracket member 228 is engaged with the clips 226, the gasket 234 is disposed in contact with the flange members 222. This provides a seal joint between the adjacent exhaust after-treatment blocks 202 and thereby avoids any possible leakages of the exhaust gases at least along a portion of engaging peripheries of the adjacent exhaust after-treatment blocks 202, in the exhaust after-treatment assembly 200. In one example, the gasket 234, as used with the bracket member 228 of the present design, is a rope gasket.

The locking arrangement 224 may have multiple possible design variations that may be used provided the clips 226 and the bracket member 228 are complementary to each other. FIGS. 7A through 7E illustrate different embodiments of the locking arrangement 224. Further, FIGS. 8A through 8E discretely illustrate different complementary designs of the bracket member 228 to be used with the different designs of the locking arrangement 224 of FIGS. 7A-7E, respectively. It may be understood that the locking arrangement 224 of the present disclosure may be employed to secure two or more exhaust after-treatment blocks 202 disposed adjacent to each other, to form the exhaust after-treatment assembly 200.

In the embodiment of FIG. 7A, the locking arrangement 224 may include the clips 226 which are in the form of louvers defining an open hem channel between two or more of the exhaust after-treatment blocks 202 disposed adjacent to each other. Further, the bracket member 228 (separately shown in FIG. 8A) may be in the form of L-shaped member which is engaged in the open hem channel. In the illustration, it may be seen that the bracket member 228 extends between the flange members 222 of four adjacent exhaust after-treatment blocks 202, thereby locking these four exhaust after-treatment blocks 202 with each other.

In the embodiment of FIG. 7B, the locking arrangement 224 may include the clips 226. Each of the clips 226 is in the form of an L-shaped extension providing vertical slots. Further, the bracket member 228 (separately shown in FIG. 8B) have one or more L-shaped legs 227 having inverted vertical slots which are complementary to be engaged with the vertical slots in the L-shaped extensions of the clips 226. In the illustration, it may be seen that the bracket member 228 extends between the flange members 222 of four adjacent exhaust after-treatment blocks 202, thereby locking these four exhaust after-treatment blocks 202 with each other.

In the embodiment of FIG. 7C, the design of the locking arrangement 224 is a combination of the design of the locking arrangements 224 of the embodiments of FIG. 7A and FIG. 7B. In the locking arrangement 224 of FIG. 7C, the clips 226 are in the form of louvers, with each of the clips 226 providing one vertical channel. Further, the bracket member 228 (separately shown in FIG. 8C) have L-shaped legs providing inverted vertical slots which are complementary to be engaged with the vertical channels formed by the clips 226. In the illustration, it may be seen that the bracket member 228 extends between the flange members 222 of four adjacent exhaust after-treatment blocks 202, thereby locking these four exhaust after-treatment blocks 202 with each other.

In the embodiment of FIG. 7D, the locking arrangement 224 may include the clips 226 which are in the form of rivets extending orthogonally outwardly from the flange members 222. In the illustrated embodiment, the clip 226 is otherwise referred as the rivet. Further, the bracket member 228 (separately shown in FIG. 8D) is in the form of a flat member having key-hole shaped slots 229 to be engaged with the rivets. It may be understood that the bracket member 228 may have other shapes, such as circular (as illustrated in the embodiment of FIGS. 7E and 8E) and still achieves the same purpose. In the illustration, it may be seen that the bracket member 228 extends between the flange members 222 of four adjacent exhaust after-treatment blocks 202, thereby locking these four exhaust after-treatment blocks 202 with each other.

INDUSTRIAL APPLICABILITY

Large power systems, like the power system 100, require exhaust after-treatment assemblies with large cross-section area which may adequately treat the exhaust gas emissions therefrom. Because of the limitation in size of the catalyst substrate that may be manufactured cost-effectively, generally multiple catalyst substrates are packed together to provide a large surface area for reduction of the large quantities of the exhaust gases to remove $NO_x$ based pollutants. However, due to variations in the shape and dimensions of the manufactured catalyst substrates, often problems occur during packing of such catalyst substrates, such as gaps left between two catalyst substrates which leaves space for the exhaust gases to pass through without being treated, and thus reducing the overall effectiveness of the exhaust after-treatment assembly.

The exhaust after-treatment assembly 200 of the present disclosure includes a plurality of exhaust after-treatment blocks 202 which are packed together by the system 201 to have substantially no gaps in between the exhaust after-treatment blocks 202. This is achieved by providing the mantle 218 with the substantially flat sidewalls 220 such that when two exhaust after-treatment blocks 202 are placed adjacent to each other, the sidewalls 220 may have smooth surface contact with each other. Further, the flange member 222 may surround the mantle 218, which encloses the catalyst substrates 204 and the compressible mat 212. The locking arrangement 224 provided on the flange members 222 securely holds the plurality of the exhaust after-treatment blocks 202 together so there is no relative movement therebetween. Further, in the present exhaust after-treatment assembly 200, the use of the compressible mat 212 ensures that there are substantially no gaps in between the catalyst substrates 204 housed in each of the exhaust after-treatment blocks 202. With no substantial gaps, there is less possibility of the exhaust gas passing through the exhaust after-treatment assembly 200 untreated, which results in better $NO_x$ reduction by the exhaust after-treatment assembly 200 of the present disclosure.

Figure 9:
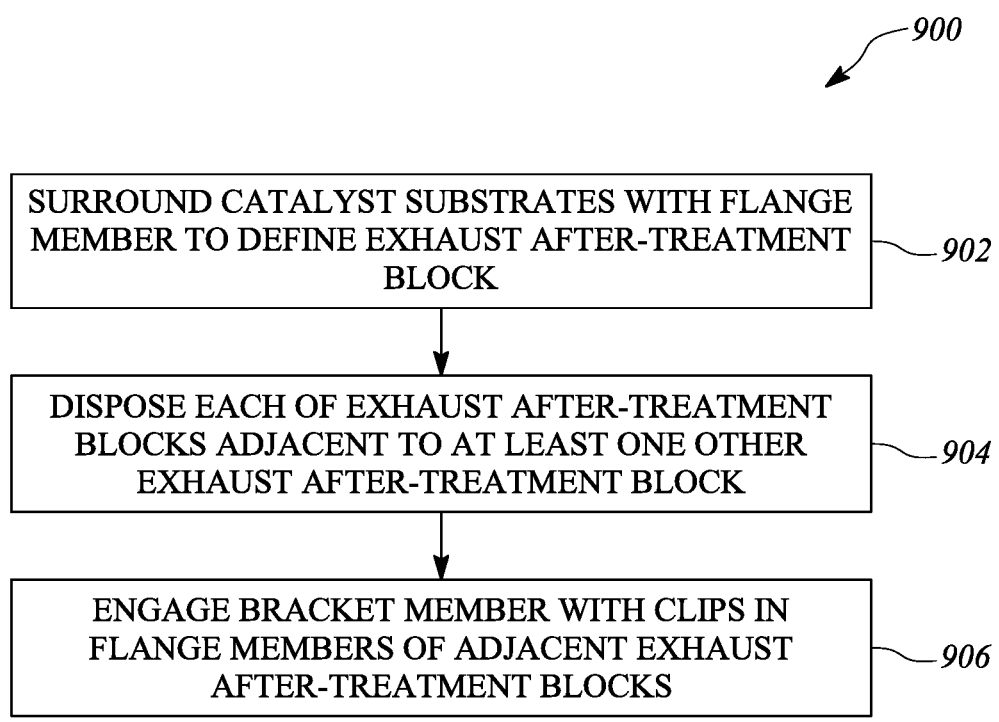
FIG. 9 illustrates a flowchart depicting a method for assembling the exhaust after-treatment assembly, in accordance with one or more embodiments of the present disclosure.

FIG. 9 illustrates a flowchart depicting the steps involved in a method 900 for assembling the exhaust after-treatment assembly 200. At block 902, the method 900 includes surrounding the one or more catalyst substrates 204 with the flange member 222 to define the exhaust after-treatment block 202. At block 904, the method 900 includes disposing each of the plurality of exhaust after-treatment blocks 202 adjacent to at least one other exhaust after treatment block 202 such that the flange members 222 of the adjacent exhaust after-treatment blocks 202 are in contact with each other. Further, at block 906, the method 900 includes engaging the bracket member 228 with the one or more clips 226 in the flange members 222 of the adjacent exhaust after-treatment blocks 202, to secure the adjacent exhaust after-treatment blocks 202 with each other.

During assembly of the exhaust after-treatment assembly 200, the exhaust after-treatment blocks 202, as illustrated in FIG. 2, are first assembled by grouping the catalyst substrates 204 into an array with the spacers (not shown) separating all adjacent catalyst substrates 204. The assembled array may temporarily be held in an assembled relationship. The method 900 may include providing the compressible mat 212 to separate the side faces 210 of each of the catalyst substrates 204, in the exhaust after-treatment block 202. The method 900 may further include providing the mantle 218 to surround the one or more catalyst substrates 204 in the exhaust after-treatment block 202. In some examples, the method 900 may further include providing the gasket 234 attached to the back surface 236 of the bracket member 228 which is usually in contact with the flange members 222 when the bracket member 228 is engaged with the one or more clips 226 of the flange members 222. Such arrangement forms the seal joint between the exhaust after-treatment blocks 202 to further reduce any chances of leakage in the exhaust after-treatment assembly 200.

The exhaust after-treatment assembly 200 of the present disclosure may be adapted to meet the specifications of any power system configuration requiring exhaust constituent conditioning. Specifically, the exhaust after-treatment assembly 200 may be adapted to meet the specification of the Diesel Oxidation Catalyst (DOC), the Diesel Particulate Filters (DPF), and the Selective Catalytic Reduction (SCR) based on the configuration of a power system; in such case, the exhaust after-treatment block 202 may be designed to pack the DOC, DPF or the SCR based on the configuration of the power system. The exhaust after-treatment assembly 200 may provide improved packaging by utilizing multiple small exhaust after-treatment blocks 202 which may efficiently use available onboard space. The exhaust after-treatment blocks 202 have been designed such that an overall size and shape thereof does not change when being used with the catalyst substrates 204 of different dimensions. Therefore, the present design increases commonality of parts between applications which may lead to smaller part count and high cost reduction. Further, this allows the exhaust after-treatment blocks 202 to be swapped and replaced for serviceability as necessary. It may be contemplated that the locking arrangement 224 provides the flexibility that one or more exhaust after-treatment blocks 202 may be unsecured and removed from the exhaust after-treatment assembly 200, while the rest of the exhaust after-treatment blocks 202 remains in corresponding position thereof. Thus, the locking arrangement 224 may make serviceability of the exhaust after-treatment assembly 200 easy and labor-intensive.

While aspects of the present disclosure have been particularly shown and described with reference to the embodiments above, it will be understood by those skilled in the art that various additional embodiments may be contemplated by the modification of the disclosed machines and assemblies without departing from the spirit and scope of what is disclosed. Such embodiments should be understood to fall within the scope of the present disclosure as determined based upon the claims and any equivalents thereof.

What is claimed is:

1. A system for assembling an exhaust after-treatment assembly having a plurality of exhaust after-treatment blocks, each of the plurality of exhaust after-treatment blocks disposed adjacent to at least one other exhaust after-treatment block, and including one or more catalyst substrates, each of the catalyst substrates including a first face, a second face, and a plurality of side faces, the system comprising:
   at least one flange member configured to surround the one or more catalyst substrates in each of the plurality of exhaust after-treatment blocks, about the side faces; and
   a locking arrangement comprising:
      one or more clips on the at least one flange member and disposed in a plane parallel to at least one of the first face and the second face; and
      a bracket member configured to engage with the one or more clips in the at least one flange member of each exhaust after-treatment block of the adjacent exhaust after-treatment blocks,
   wherein the bracket member comprises a gasket attached to a back surface of the bracket member such that the gasket provides a seal joint when the bracket member is engaged with the one or more clips of the at least one flange member of each of the adjacent exhaust after-treatment blocks.

2. The system of claim 1, wherein the at least one flange member is a rigid member.

3. The system of claim 1 comprising multiple flange members for each exhaust after-treatment block, wherein the multiple flange members have identical size and shape.

4. The system of claim 3, wherein each flange member of the multiple flange members includes flat sidewalls.

5. The system of claim 4, wherein the flat sidewalls of the multiple flange members of each of the adjacent exhaust after-treatment blocks are in contact with each other.

6. The system of claim 1, wherein the gasket is a rope gasket.

7. The system of claim 1, wherein the clip defines an open hem channel configured to engage with the bracket member.

8. The system of claim 1, wherein the clip is an L-shaped extension and the bracket member includes an L-shaped leg configured to engage with the L-shaped extension.

9. The system of claim 1, wherein the clip is a rivet and the bracket member includes a key-hole shaped slot configured to engage with the rivet.

10. A method of assembling an exhaust after-treatment assembly, comprising:
   surrounding one or more catalyst substrates with at least one flange member to define an exhaust after-treatment block, the at least one flange member having flat sidewalls and comprising one or more clips;
   disposing each of a plurality of exhaust after-treatment blocks adjacent to at least one other exhaust after-treatment block such that the flat sidewalls of the flange members of the adjacent exhaust after-treatment blocks are in contact with each other;
   providing a gasket attached to a back surface of the bracket member to form a seal joint between the adjacent exhaust after-treatment blocks when the bracket member is engaged with the one or more clips of the at least one flange member of each of the adjacent exhaust after-treatment blocks; and
   engaging a bracket member with the one or more clips in the at least one flange member of each of the adjacent exhaust after-treatment blocks.

11. The method of claim 10 further comprising, providing one or more compressible mats to separate side faces of each of the catalyst substrates in the exhaust after-treatment block.

12. The method of claim 11 further comprising, surrounding the one or more catalyst substrates with a mantle about the side faces of each of the catalyst substrates, wherein the mantle is located between a flange member disposed at a first face and another flange member disposed at a second face of the one or more catalyst substrates in the exhaust after-treatment block.

13. An exhaust after-treatment assembly, comprising:
   a plurality of exhaust after-treatment blocks, each of the plurality of exhaust after-treatment blocks disposed adjacent to at least one other exhaust after-treatment block, each of the plurality of exhaust after-treatment blocks comprising:
      one or more catalyst substrates, each of the one or more catalyst substrates longitudinally extending between a first face and a second face, and having a plurality of side faces, each of the one or more catalyst substrates is disposed next to at least one other catalyst substrate; and
      at least one flange member surrounding the one or more catalyst substrates in each of the plurality of exhaust after-treatment blocks, about the side faces; and
   a locking arrangement comprising:
      one or more clips on the at least one flange member and disposed in a plane parallel to at least one of the first face and the second face; and
      a bracket member configured to engage with the one or more clips in the at least one flange member of each of the adjacent exhaust after-treatment blocks,
   wherein the bracket member comprises a gasket attached to a back surface of the bracket member such that the gasket provides a seal joint when the bracket member is engaged with the one or more clips of the at least one flange member of each of the adjacent exhaust after-treatment blocks.

14. The exhaust after-treatment assembly of claim 13, wherein each of the plurality of exhaust after-treatment blocks comprises a mantle surrounding the one or more catalyst substrates about the side faces.

15. The exhaust after-treatment assembly of claim 13, wherein each of the plurality of exhaust after-treatment blocks comprises one or more compressible mats to separate the side faces of each of the catalyst substrates.

16. The exhaust after-treatment assembly of claim 13, wherein the first face and the second face of the one or more catalyst substrates have either a square or a rectangular shape.

17. The exhaust after-treatment assembly of claim 13, wherein the at least one flange member has either a square or a rectangular shape.

* * * * *